(12) United States Patent
Ko

(10) Patent No.: US 8,970,969 B2
(45) Date of Patent: Mar. 3, 2015

(54) IMAGE LENS WITH HIGH RESOLUTION AND SMALL DISTANCE

(75) Inventor: Chun-Cheng Ko, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 355 days.

(21) Appl. No.: 13/441,950

(22) Filed: Apr. 9, 2012

(65) Prior Publication Data

US 2013/0222893 A1 Aug. 29, 2013

(30) Foreign Application Priority Data

Feb. 23, 2012 (TW) .............................. 101105944 A

(51) Int. Cl.
*G02B 3/02* (2006.01)
*G02B 13/18* (2006.01)
(52) U.S. Cl.
USPC ........................................................... 359/714
(58) Field of Classification Search
None
See application file for complete search history.

(56) References Cited

U.S. PATENT DOCUMENTS

| | | | | |
|---|---|---|---|---|
| 7,177,098 | B2 * | 2/2007 | Arai | 359/715 |
| 8,520,124 | B2 * | 8/2013 | Ozaki | 348/335 |
| 2010/0220229 | A1 * | 9/2010 | Sano | 348/340 |
| 2012/0250167 | A1 * | 10/2012 | Hashimoto | 359/738 |
| 2014/0146399 | A1 * | 5/2014 | Ko | 359/714 |

* cited by examiner

*Primary Examiner* — Derek S Chapel
(74) *Attorney, Agent, or Firm* — Novak Druce Connolly Bove + Quigg LLP

(57) ABSTRACT

An image lens, in the order from the object side to the image side thereof, includes a first lens including a first surface and a second surface, a second lens including a third surface and a fourth surface, a third lens including a fifth surface and a sixth surface, a fourth lens including a seventh surface and a eighth surface, a fifth lens including a ninth surface and a tenth surface, and an image plane. The image lens satisfies the following formulas: (1) D/TTL>0.94; (2) D/L>1.21; wherein D is the maximum image diameter of the image plane; TTL is a total length of the image lens, and L is a distance from an outmost edge of the tenth surface to an optical axis of the image lens along a direction perpendicular to the optical axis.

7 Claims, 17 Drawing Sheets

IMAGE LENS WITH HIGH RESOLUTION AND SMALL DISTANCE

BACKGROUND

1. Technical Field

The present disclosure relates to lenses and, particularly, to an image lens with high resolution and small distance.

2. Description of Related Art

Image sensors are used to capture an image. A size of an image sensor, such as a complementary metal oxide semiconductor device (CMOS), decreases with development of technology. For proper matching with the image sensor, an image lens, which is essentially comprised of a number of lenses, should be able to meet requirements, such as, high resolution and small distance. However, the existing image lenses cannot meet these requirements, thus, results in poor imaging effect.

Therefore, it is desirable to provide an image lens which can overcome the limitations described above.

DETAILED DESCRIPTION

Embodiments of the disclosure will now be described in detail with reference to the accompanying drawings.

Figure 1:
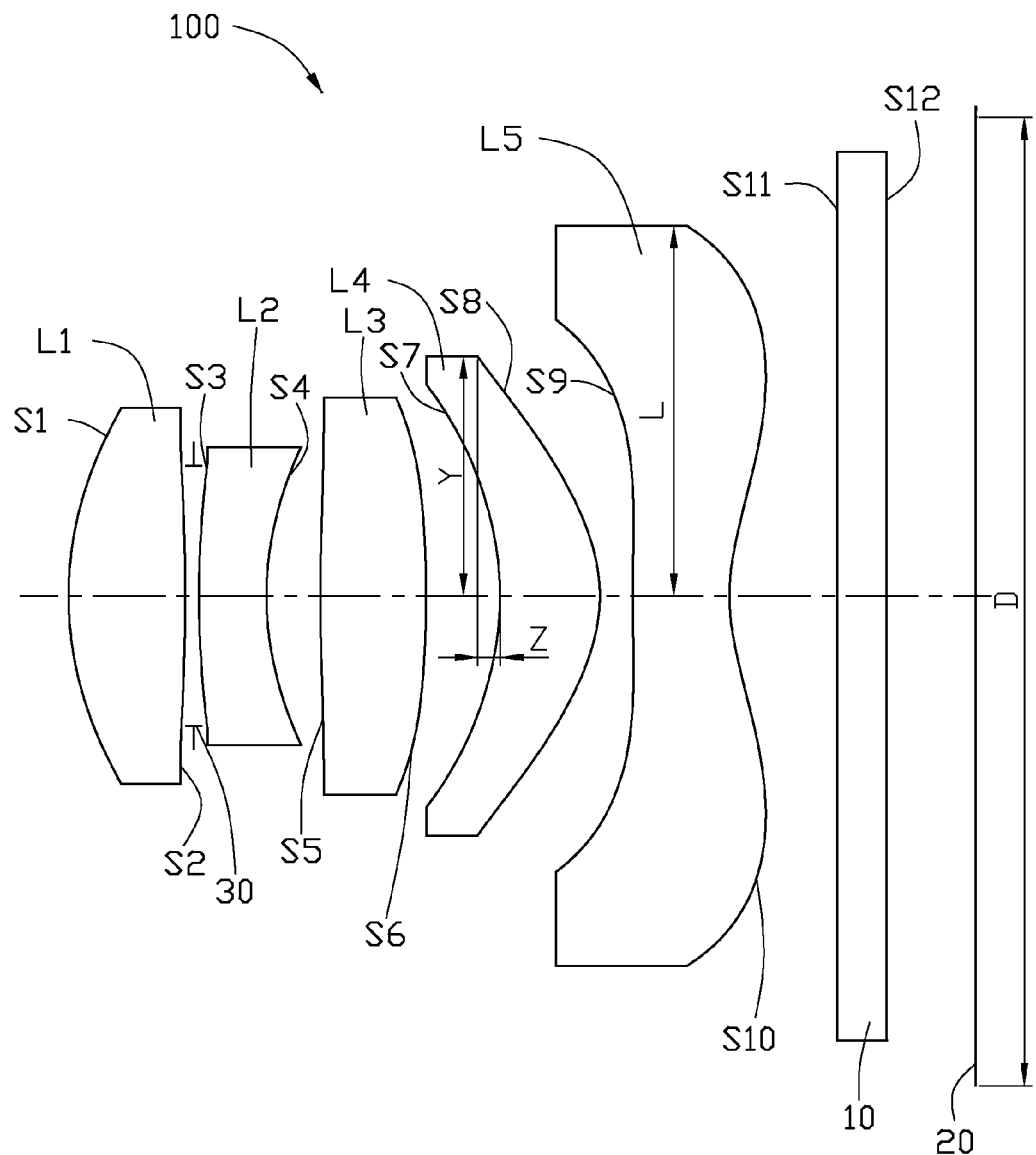
FIG. 1 is a schematic view of an image lens in accordance with the present disclosure.

FIG. 1, shows an image lens 100, according to an exemplary embodiment, optically capturing an image of an object at an object side and forming a corresponding image on an image plane 20. The image lens 100 includes, in an order from the object side to the image side, a first lens L1 with positive refraction power, a second lens L2 with negative refraction power, a third lens L3 with positive refraction power, a fourth lens L4 with positive refraction power, a fifth lens L5 with negative refraction power, and IR-cut filter 10.

The first lens L1 includes a convex first surface S1 facing the object side and a convex second surface S2 facing the image side.

The second lens L2 includes a convex third surface S3 facing the object side and a concave fourth surface S4 facing the image side.

The third lens L3 includes a convex third surface S5 facing the object side and a convex sixth surface S6 facing the image side.

The fourth lens L4 includes a concave seventh surface S7 facing the object side and a convex eighth surface S8 facing the image side.

The fifth lens L5 includes a concave ninth surface S9 facing the object side and a concave tenth surface S10 facing the image side.

The IR-cut filter 10 includes an eleventh surface S11 facing the object side and a twelfth surface S12 facing the image side.

The image lens 100 further includes an aperture stop 30. The aperture stop 30 is positioned between the first lens L1 and the second lens L2. Light rays enter the image lens 100, passing through the first lens L1, the aperture stop 30, the second lens L2, the third lens L3, the fourth lens L4, the fifth lens L5, and the IR-cut filter 10, finally forming optical images on the image plane 20. The aperture stop 30 is for adjusting light flux from the first lens L1 to the second lens L2. In addition, the aperture stop 30 facilitates uniform light transmission when light passes through the first lens L1 to correct coma aberrations of the image lens 100. The IR-cut filter 10 filters/removes infrared light from the light rays.

The image lens 100 satisfies the formulas:

$$D/TTL > 0.94; \quad (1)$$

$$D/L > 1.21; \quad (2)$$

wherein D is the maximum image diameter of the image plane 20; TTL is a total length of the image lens 100; L is a distance from an outmost edge of the tenth surface S10 to an optical axis of the image lens 100 along a direction perpendicular to the optical axis of the image lens 100.

The formulas (1) to (2) are for shortening the length of the image lens 100, and reducing the aberration of the field curvature and spherical aberration in the zoom process. If the image lens 100 does not satisfy the formulas (1) to (2), the distance of the image lens 100 cannot be maintained and the images captured by the image lens 100 cannot be corrected.

The image lens 100 further satisfies the formula:

$$Z/Y > 0; \quad (3)$$

wherein Z is a distance from a central point of the seventh surface S7 to an outmost edge of the eighth surface S8 along the optical axis, Y is a distance from an outmost edge of the eighth surface S8 to the optical axis along a direction perpendicular to the optical axis.

Formula (3) is for properly distributing the refraction power, while maintaining a relatively small spherical aberration.

The image lens 100 further satisfies the formulas:

$$R31/F3 > R11/F1 > 0; \quad (4)$$

$$R12/F1 < R32/F3 < 0; \quad (5)$$

wherein R11 is the curvature radius of the first surface S1 of the first lens L1; R12 is the curvature radius of the second surface S2 of the first lens L1; R31 is the curvature radius of the fifth surface S5 of the third lens L3, R32 is the curvature radius of the sixth surface S6 of the third lens L3; F1 is focal length of the first lens L1, and F3 is focal length of the third lens L3.

Formulas (4)-(5) are for maintaining quality of images captured by the image lens 100. If the image lens 100 does not satisfy the formulas (4) to (5), the images captured by the image lens 100 cannot be corrected.

The image lens 100 further satisfies the formulas:

$$R51/F5 < R52/F5 < 0; \quad (6)$$

wherein R51 is the curvature radius of the ninth surface S9 of the fifth lens L5; R52 is the curvature radius of the tenth surface S10 of the fifth lens L5; F5 is focal length of the fifth lens L5.

Formula (6) is for correcting chromatic aberration of the image lens 100. If the image lens 100 does not satisfy the formula (6), the images captured by the image lens 100 will have a greater chromatic aberration.

All of the first, second, third, fourth, fifth, sixth, seventh, eighth, ninth, tenth surfaces S1, S2, S3, S4, S5, S6, S7, S8, S9 and S10 are aspherical surfaces. Each aspherical surface is shaped according to the formula:

$$Z = \frac{ch^2}{1 + \sqrt{1 - (k+1)c^2 h^2}} + \sum A_i h^i$$

wherein Z is the length of a line drawn from a point on the aspherical surface to the tangential plane of the aspherical surface, h is the height from the optical axis to the point on the aspherical surface, c is a vertex curvature (=1/R, the radius of curvature), k is a conic constant, and Ai are the correction coefficients, to the order of "i" of the aspherical surface.

Detailed examples of the imaging lens 100 are given below in accompany with FIGS. 2-17, but it should be noted that the imaging lens 100 is not limited by these examples. Listed below are the symbols used in these detailed examples:

FNo: F number;
2ω: field angle;
ri: radius of curvature of the surface Si;
Di: distance between surfaces on the optical axis of the surface Si and the surface Si+1;
Ni: refractive index of the surface Si;
Vi: Abbe constant of the surface Si;
Ki: Secondary curvature of the surface Si.

Example 1

Tables 1-4 show a first embodiment of the image lens 100.

TABLE 1

| Surface | type | ri (mm) | Di (mm) | ni | Vi | ki |
|---|---|---|---|---|---|---|
| first surface S1 | aspherical | 2.10 | 0.70 | 1.53 | 56.0 | −0.54 |
| second surface S2 | aspherical | −10.41 | 0.05 | — | — | — |
| aperture stop 30 | standard | Infinity | 0.03 | — | — | — |
| third surface S3 | aspherical | 5.41 | 0.41 | 1.63 | 23.4 | −58.69 |
| fourth surface S4 | aspherical | 1.80 | 0.33 | — | — | −0.33 |
| fifth surface S5 | aspherical | 9.69 | 0.64 | 1.53 | 56.0 | — |
| sixth surface S6 | aspherical | −7.51 | 0.45 | — | — | — |

TABLE 1-continued

| Surface | type | ri (mm) | Di (mm) | ni | Vi | ki |
|---|---|---|---|---|---|---|
| seventh surface S7 | aspherical | −1.82 | 0.60 | 1.53 | 56.0 | −3.64 |
| eighth surface S8 | aspherical | −0.98 | 0.20 | — | — | −3.15 |
| ninth surface S9 | aspherical | 15.00 | 0.58 | 1.53 | 56.0 | — |
| tenth surface S10 | aspherical | 1.25 | 0.65 | — | — | −7.68 |
| eleventh surface S11 | standard | Infinity | 0.30 | 1.52 | 58.6 | — |
| twelfth surface S12 | standard | Infinity | 0.54 | — | — | — |
| image plane 20 | standard | — | — | — | — | — |

TABLE 2

| aspherical coefficient | first surface S1 | second surface S2 | third surface S3 | fourth surface S4 | fifth surface S5 |
|---|---|---|---|---|---|
| A4 | 5.6E−03 | 0.0171 | −3.5E−03 | −0.0865 | −0.0417 |
| A6 | −4.2E−03 | 0.0159 | 0.0403 | 0.0969 | −0.0121 |
| A8 | 1.5E−03 | −0.0154 | −5.7E−03 | −0.0452 | 0.0271 |
| A10 | 3.3E−03 | −0.0139 | −0.0558 | 3.6E−04 | −2.2E−03 |
| A12 | −3.4E−03 | 8.2E−03 | 0.0246 | 5.8E−04 | −1.9E−04 |
| A14 | −1.5E−04 | 5.9E−04 | 8.0E−03 | 2.2E−04 | −1.2E−03 |

TABLE 3

| aspherical coefficient | sixth surface S6 | seventh surface S7 | eighth surface S8 | ninth surface S9 | tenth surface S10 |
|---|---|---|---|---|---|
| A4 | −0.0274 | −0.0165 | −0.0600 | −0.0860 | −0.0643 |
| A6 | −8.5E−03 | −0.0132 | 0.0168 | 3.0E−03 | 0.0156 |
| A8 | −0.0122 | −1.7E−03 | 4.9E−04 | 6.1E−03 | −3.1E−03 |
| A10 | 7.9E−03 | 2.0E−03 | −2.6E−04 | −1.8E−03 | 1.7E−04 |
| A12 | 7.2E−06 | −4.7E−06 | 3.3E−05 | −2.2E−04 | 2.6E−05 |
| A14 | 1.4E−05 | −8.5E−06 | −4.5E−06 | 6.7E−05 | −4.1E−06 |

TABLE 4

| F(mm) | F/No | 2ω |
|---|---|---|
| 4.44 | 2.50 | 66.21° |

In the embodiment, D=5.867 mm; TTL=5.48 mm; Z=0.137 mm; Y=1.45 mm; L=4.47 mm; F1=3.32; F3=7.99 mm; F5=−2.57 mm.

Figure 2:
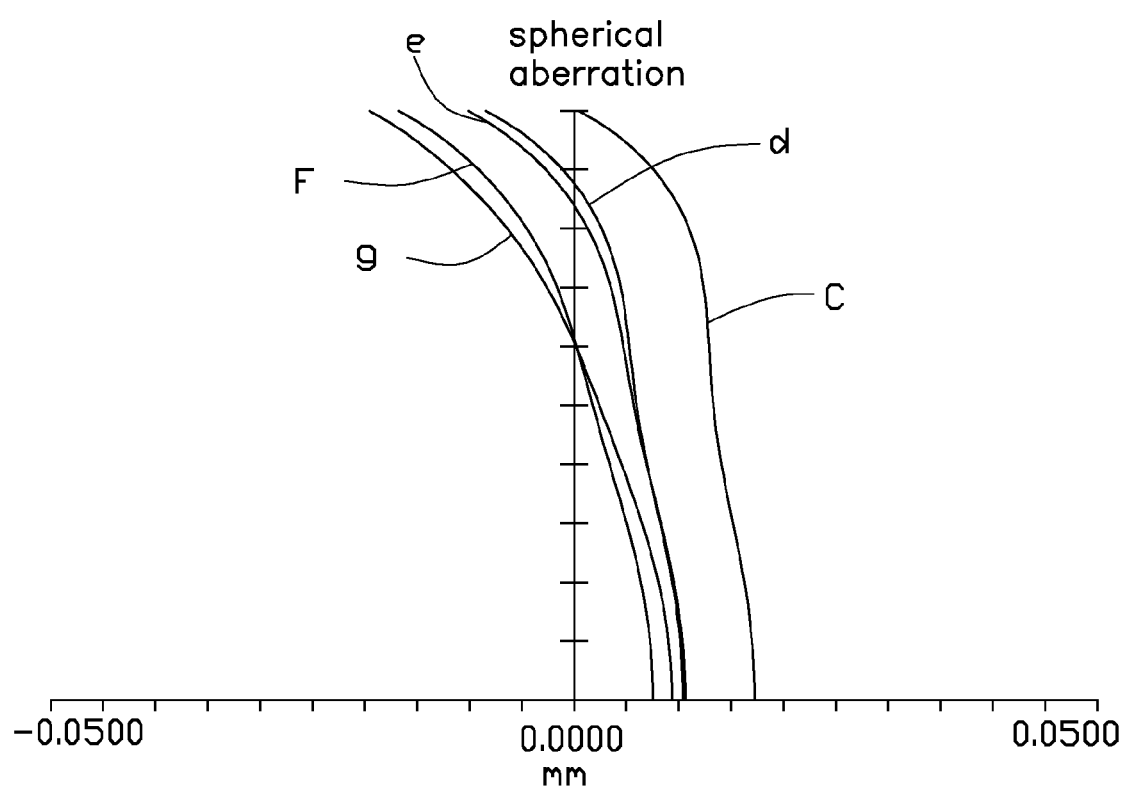
FIGS. 2~5 are graphs respectively showing spherical aberration, field curvature, distortion, and characteristic curves of modulation transfer function occurring in the image lens, that is in a telephoto state, according to a first exemplary embodiment.
Figure 3:
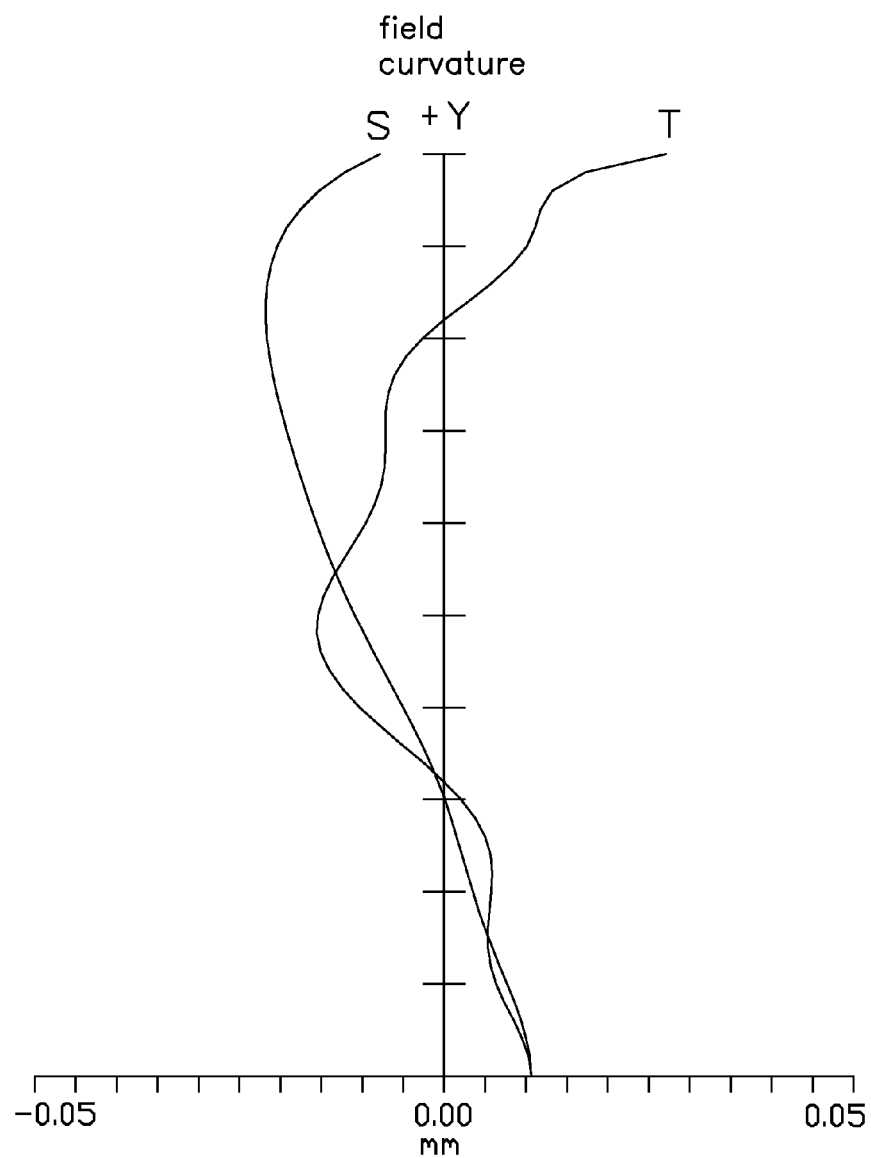
Figure 4:
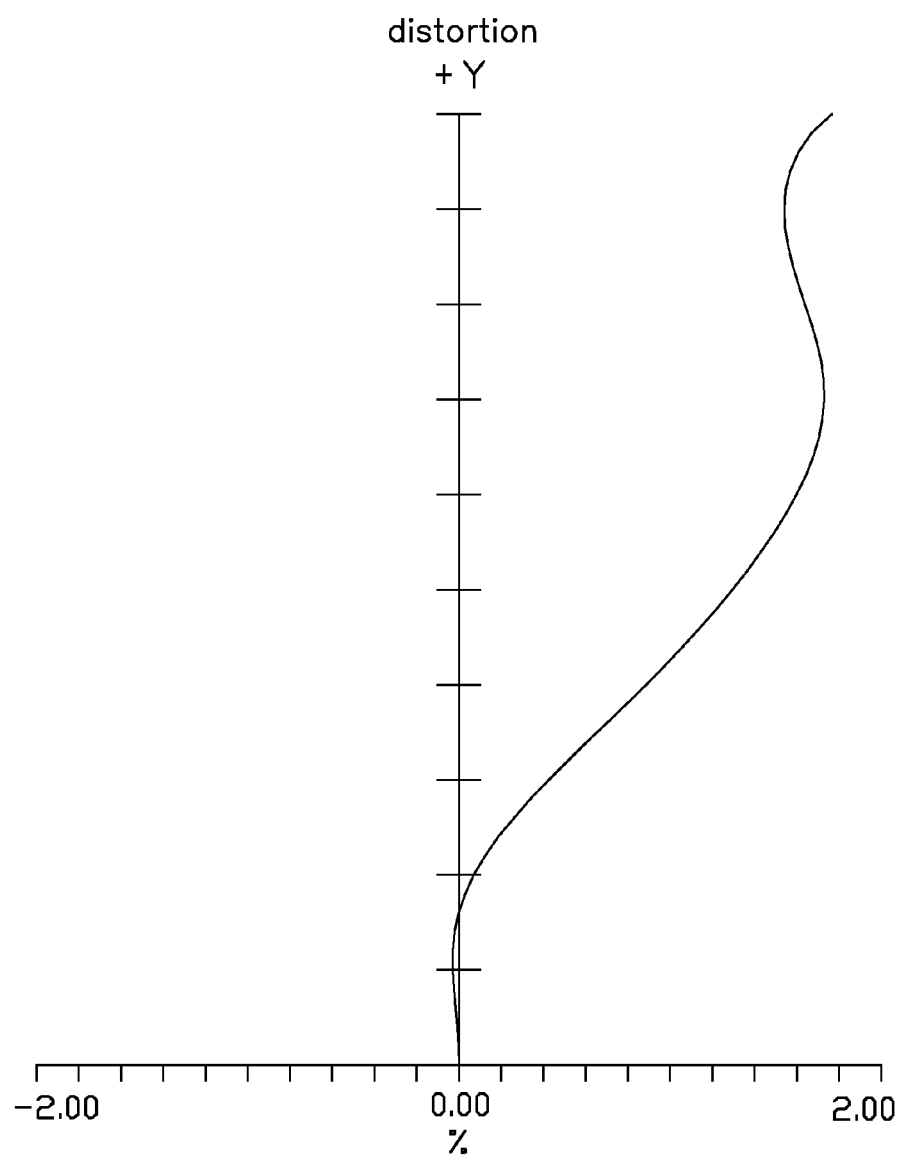
Figure 5:
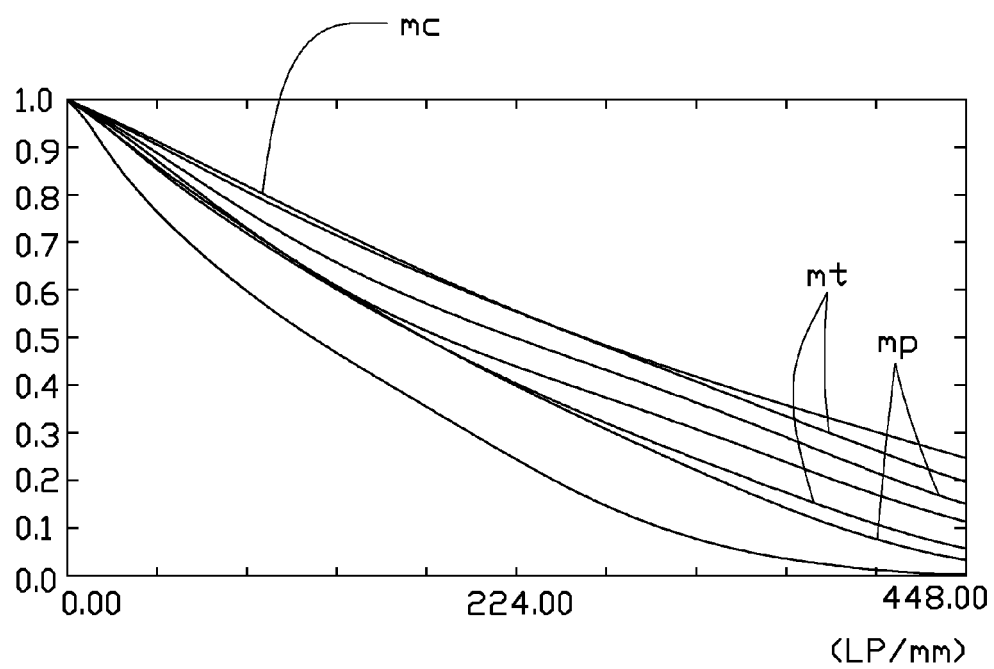
Figure 6:
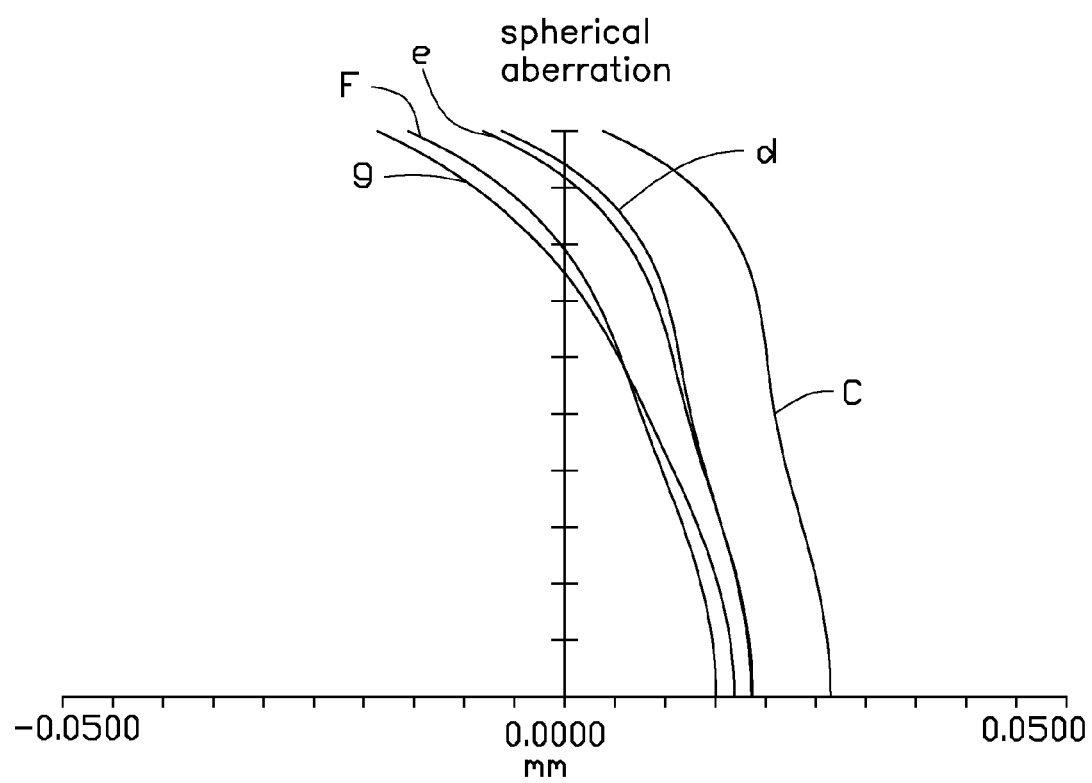
FIGS. 6~9 are graphs respectively showing spherical aberration, field curvature, distortion, and characteristic curves of modulation transfer function occurring in the image lens, that is in a wide-angle state, according to the first exemplary embodiment.
Figure 7:
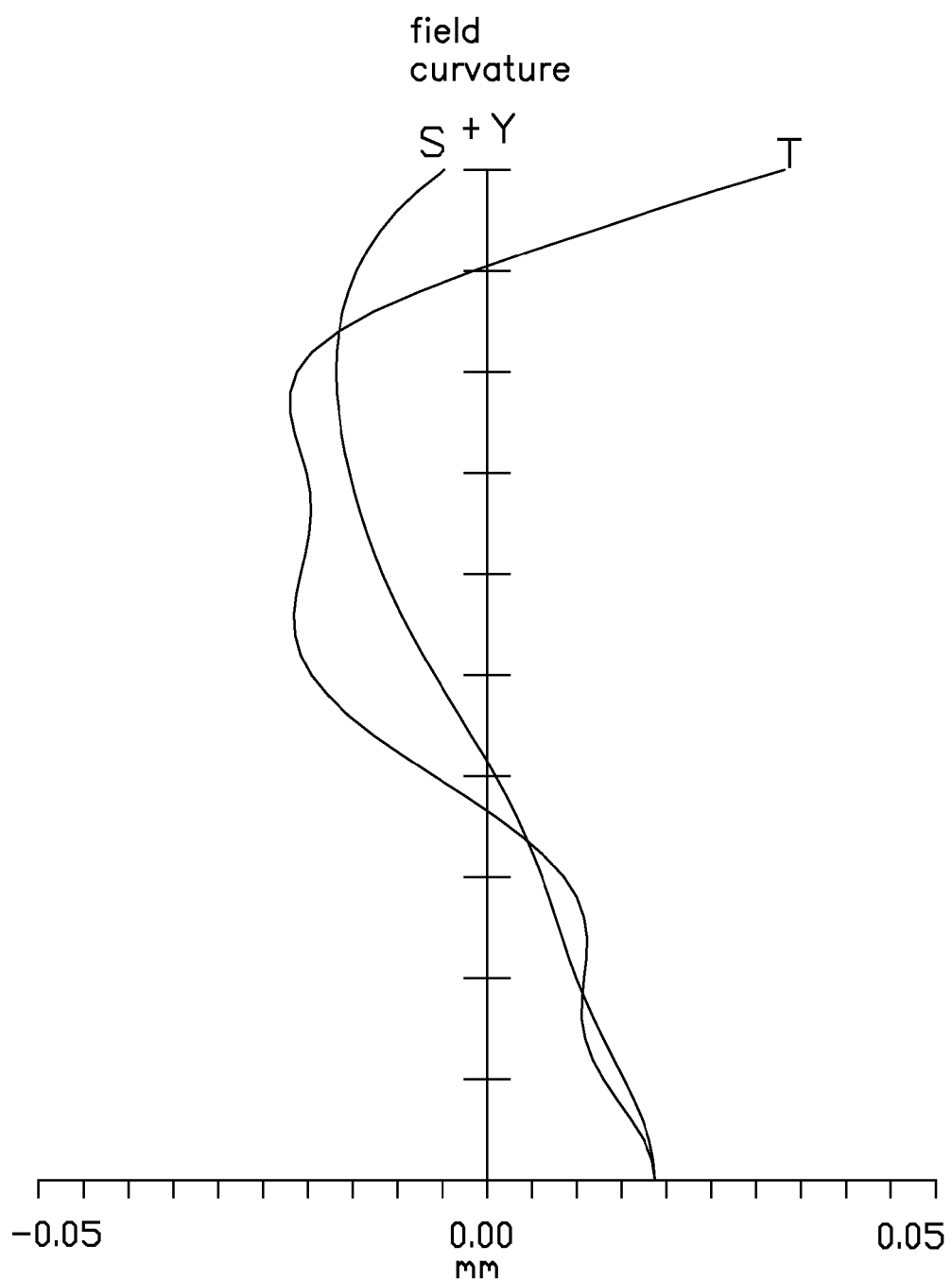
Figure 8:
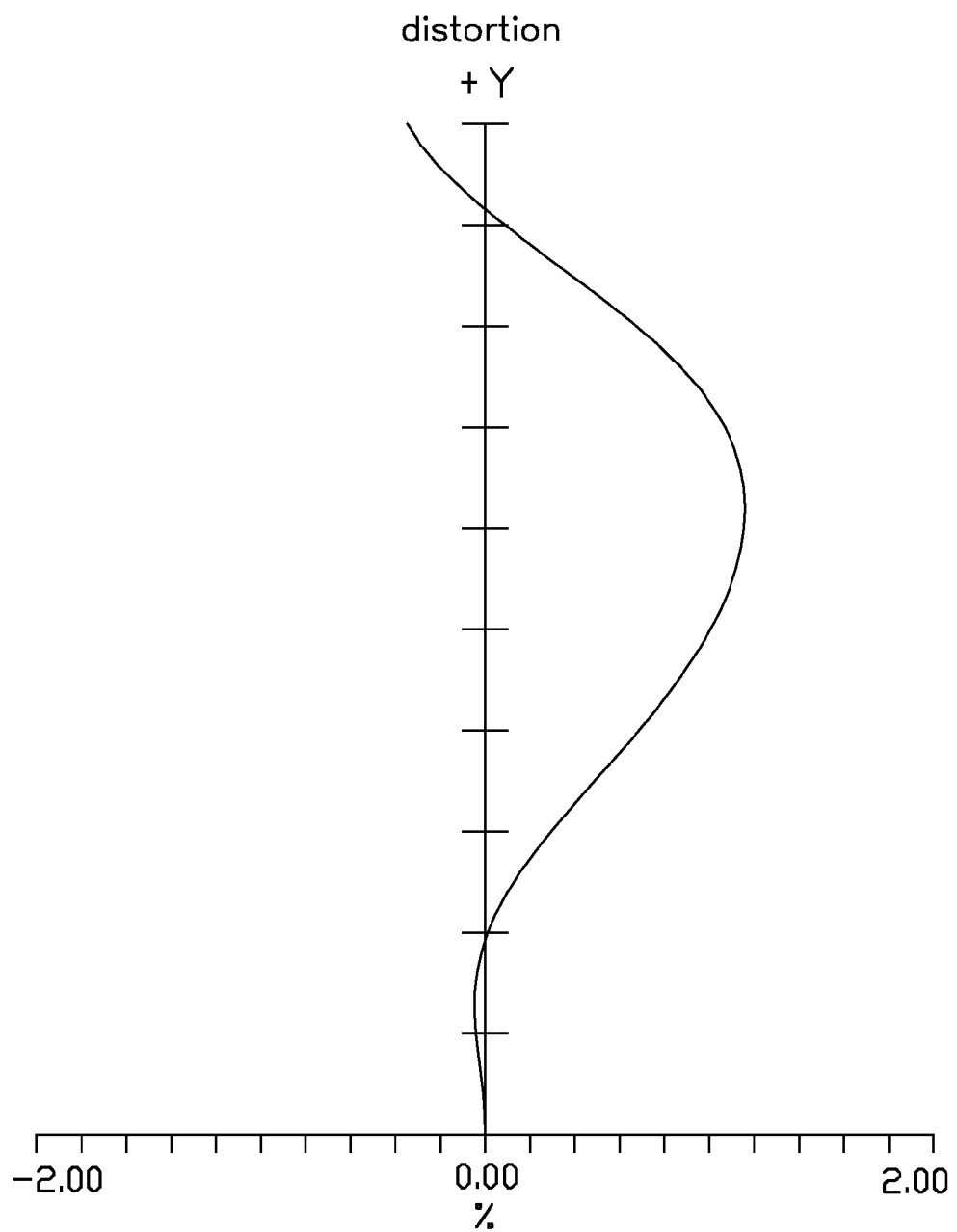
Figure 9:
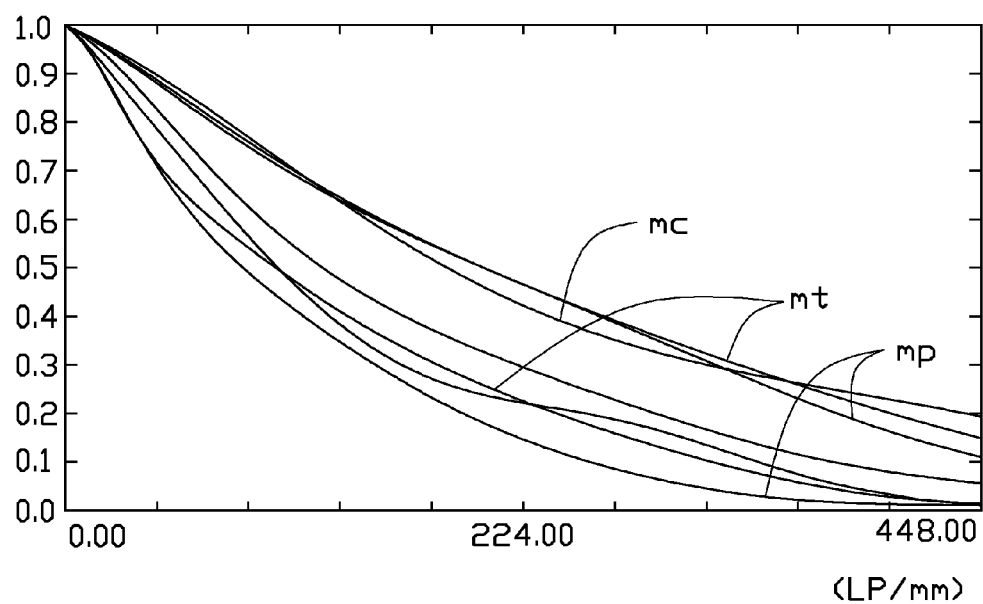

FIGS. 2-5 are graphs of aberrations (spherical aberration, field curvature, distortion, and characteristic curves of modulation transfer function occurring in the first exemplary embodiment of the image lens 100 in a telephoto state. FIGS. 6-9, are graphs of aberrations (spherical aberration, field curvature, distortion, and lateral chromatic aberration) of the first exemplary embodiment of the image lens 100 in a wide angle state. In FIGS. 2 and 6, curves are spherical aberration characteristic curves of F light (wavelength: 486 nm), d light (wavelength: 588 nm) and C light (wavelength: 654 nm) of the image system 100. The spherical aberration of the image lens 100 of the first exemplary embodiment is from −0.05 mm to 0.05 mm. As illustrated in FIGS. 3 and 7, the curves T and S are respectively the tangential field curvature curve and the sagittal field curvature curve. The field curvature of the first exemplary embodiment of the image lens 100 is from −0.05 mm to 0.05 mm. In FIGS. 4 and 8, the distortion of the first exemplary embodiment of the image lens system 100 is from −2.00% to 2.00%. Furthermore, as shown in FIG. 5, for half of the Nyquist frequency (about 2241 p/mm), the MTF of the central field is greater than 55% (see curve mc), the MTF of the 0.8 field is greater than 40% (see curve mp), the MTF between the central field and the 0.8 field is in a range of: 40%~55% (see curve mt, for example). As shown in FIG. 9, for half of the Nyquist frequency (about 2241 p/mm), the MTF of the central field is greater than 42% (see curve mc). The MTF of the 0.8 field is greater than 14% (see curve mp). The MTF between the central field and the 0.8 field is in a range of: 14%~42% (see curve mt, for example).

Example 2

Tables 5-8 show a second embodiment of the image lens 100.

TABLE 5

| Surface | type | ri (mm) | Di (mm) | ni | vi | ki |
|---|---|---|---|---|---|---|
| first surface S1 | aspherical | 2.14 | 0.52 | 1.53 | 56.0 | 0.42 |
| second surface S2 | aspherical | −15.53 | 0.07 | — | — | −58.87 |
| aperture stop 30 | standard | Infinity | 0.06 | — | — | — |
| third surface S3 | aspherical | 5.69 | 0.39 | 1.63 | 23.4 | — |
| fourth surface S4 | aspherical | 1.88 | 0.35 | — | — | −7.00 |
| fifth surface S5 | aspherical | 7.16 | 0.58 | 1.53 | 56.0 | — |
| sixth surface S6 | aspherical | −9.75 | 0.41 | — | — | — |
| seventh surface S7 | aspherical | −1.89 | 0.70 | 1.53 | 56.0 | — |
| eighth surface S8 | aspherical | −0.98 | 0.25 | — | — | −2.80 |
| ninth surface S9 | aspherical | 423.22 | 0.58 | 1.53 | 56.0 | — |
| tenth surface S10 | aspherical | 1.41 | 0.25 | — | — | −8.33 |
| eleventh surface S11 | standard | Infinity | 0.30 | 1.52 | 58.6 | — |
| twelfth surface S12 | standard | Infinity | 1.07 | — | — | — |
| image plane 20 | standard | — | — | — | — | — |

TABLE 6

| aspherical coefficient | first surface S1 | second surface S2 | third surface S3 | fourth surface S4 | fifth surface S5 |
|---|---|---|---|---|---|
| A4 | −3.3E−03 | 8.1E−03 | −0.0769 | 9.4E−03 | −0.0589 |
| A6 | 1.9E−03 | 0.0370 | 0.1175 | 0.0456 | 0.0127 |
| A8 | −4.1E−03 | −0.0326 | −0.0963 | −0.0436 | −9.0E−03 |
| A10 | 8.3E−03 | 7.4E−03 | 0.0107 | 0.0261 | 0.0213 |
| A12 | −3.8E−03 | 3.3E−06 | 0.0117 | −0.0116 | −6.1E−03 |

TABLE 7

| aspherical coefficient | sixth surface S6 | seventh surface S7 | eighth surface S8 | ninth surface S9 | tenth surface S10 |
|---|---|---|---|---|---|
| A4 | −0.0281 | 0.0266 | −0.0672 | −0.0682 | −0.0679 |
| A6 | −9.0E−03 | −4.9E−03 | 0.0131 | −6.0E−03 | 0.0184 |
| A8 | 1.5E−03 | −1.5E−03 | 2.5E−03 | 9.9E−03 | −4.8E−03 |
| A10 | −2.0E−03 | 1.5E−03 | −1.7E−03 | −4.3E−03 | 6.5E−04 |
| A12 | 3.3E−03 | −4.9E−06 | 4.2E−04 | 5.5E−04 | −4.2E−05 |

TABLE 8

| F(mm) | F/No | 2ω |
|---|---|---|
| 4.52 | 2.51 | 65.43° |

In the embodiment, D=5.867 mm; TTL=5.66 mm; Z=0.121 mm; Y=1.44 mm; L=4.42 mm; F1=3.55 mm; F3=7.78 mm; F5=−2.63 mm.

Figure 10:
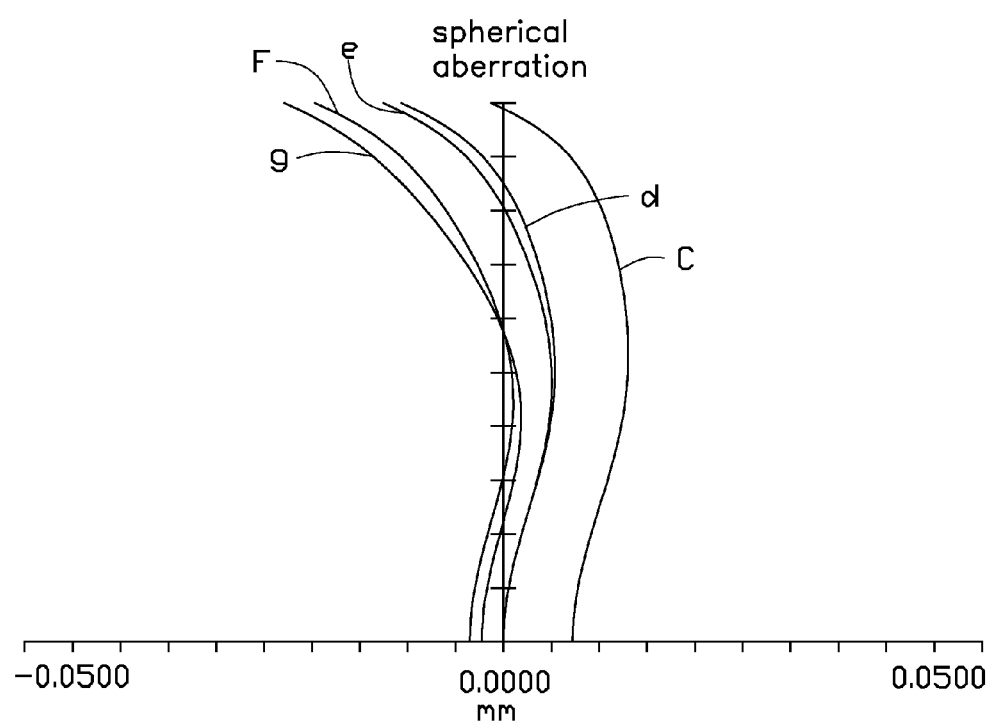
FIGS. 10~13 are graphs respectively showing spherical aberration, field curvature, distortion, and characteristic curves of modulation transfer function occurring in the image lens, that is in a telephoto state, according to a second exemplary embodiment.
Figure 11:
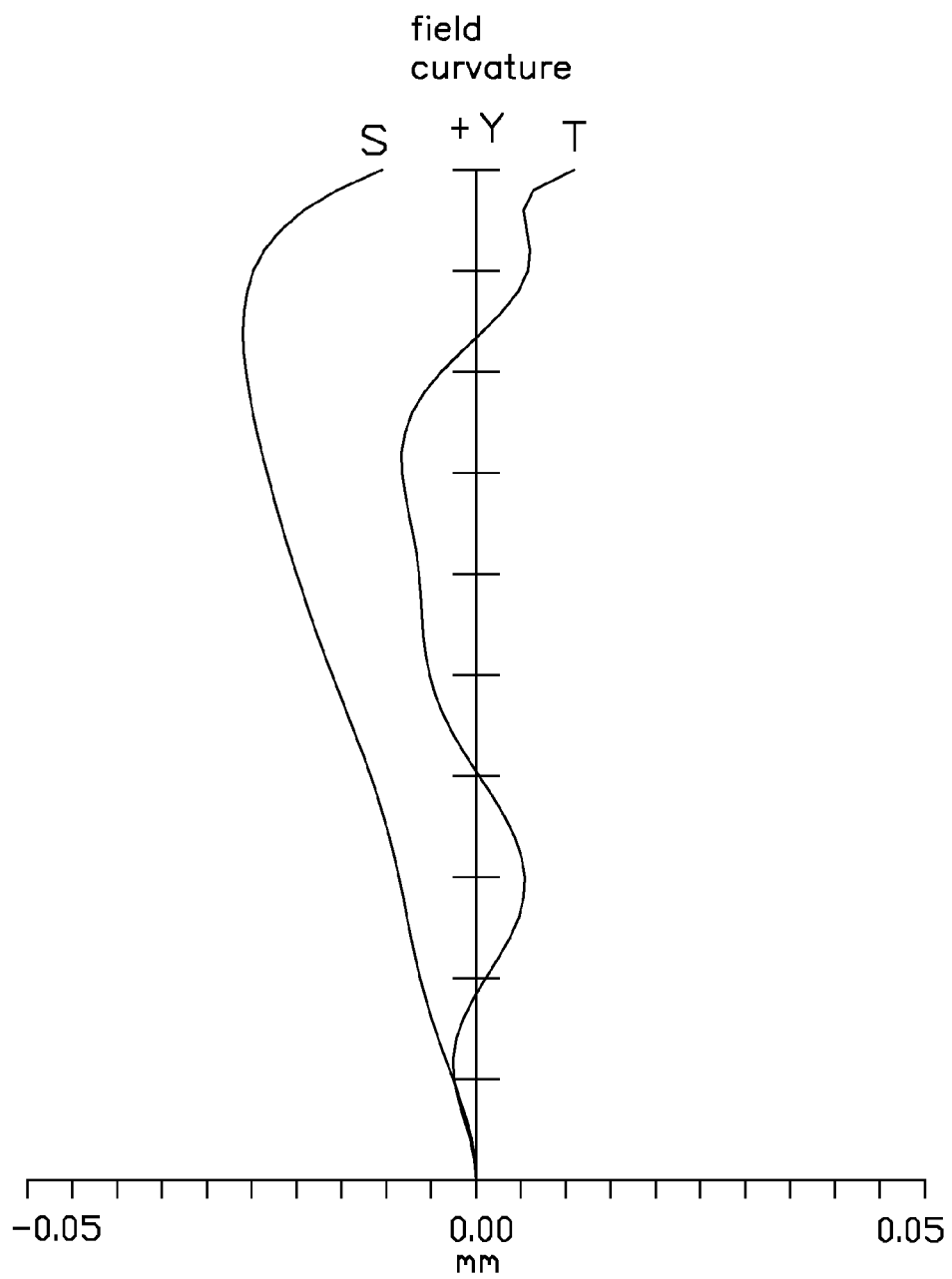
Figure 12:
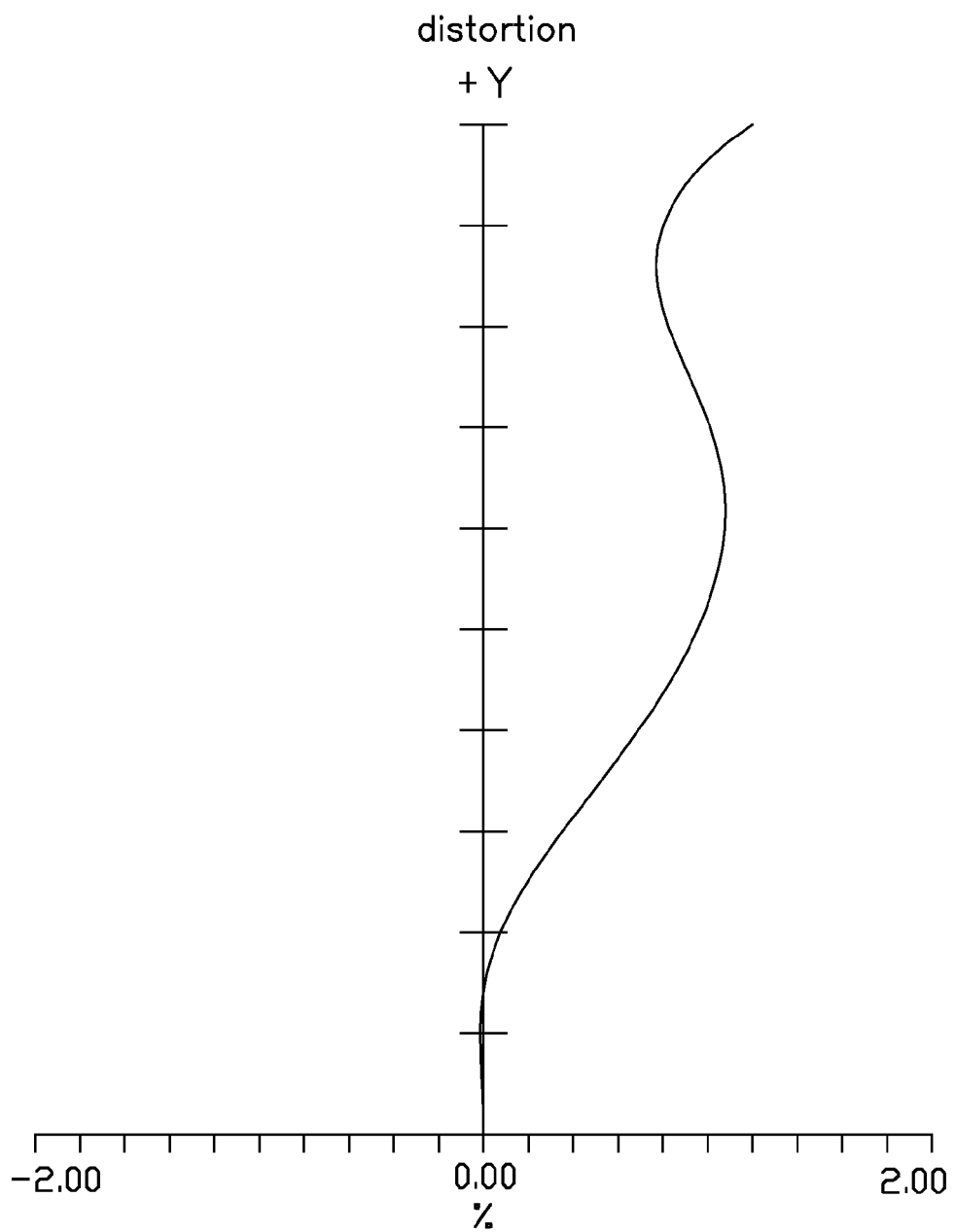
Figure 13:
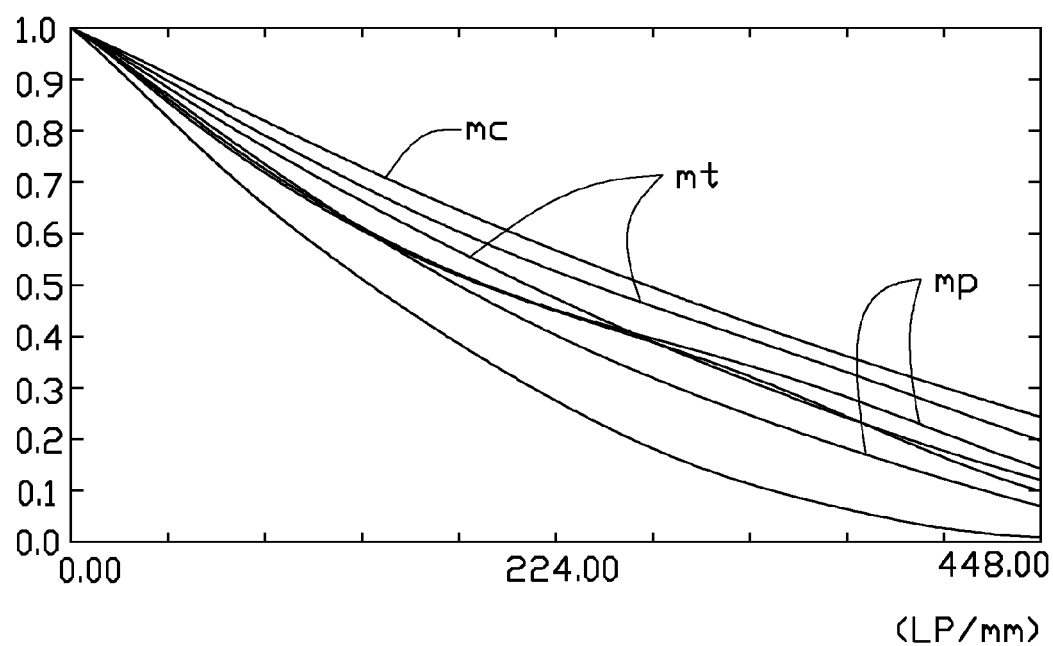
Figure 14:
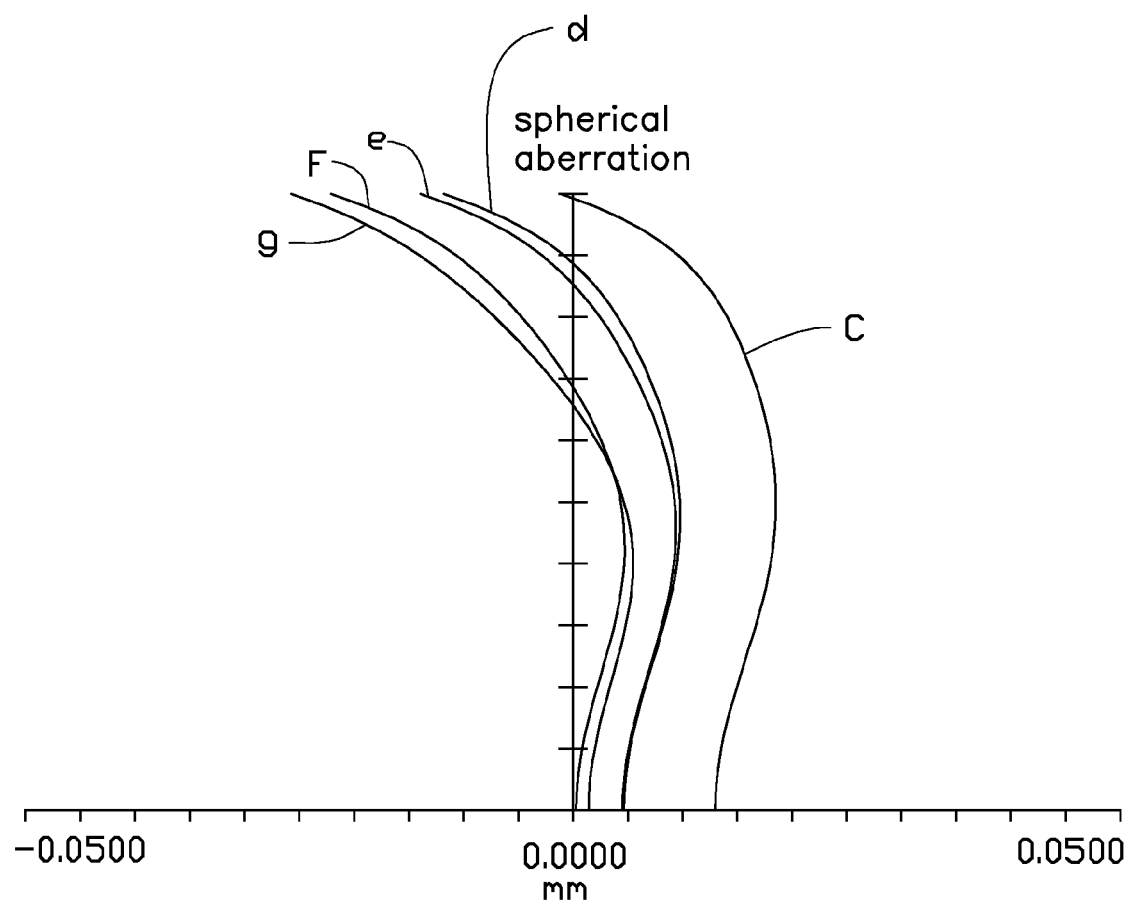
FIGS. 14~17 are graphs respectively showing spherical aberration, field curvature, distortion, and characteristic curves of modulation transfer function occurring in the image lens, that is in a wide-angle state, according to the second exemplary embodiment.
Figure 15:
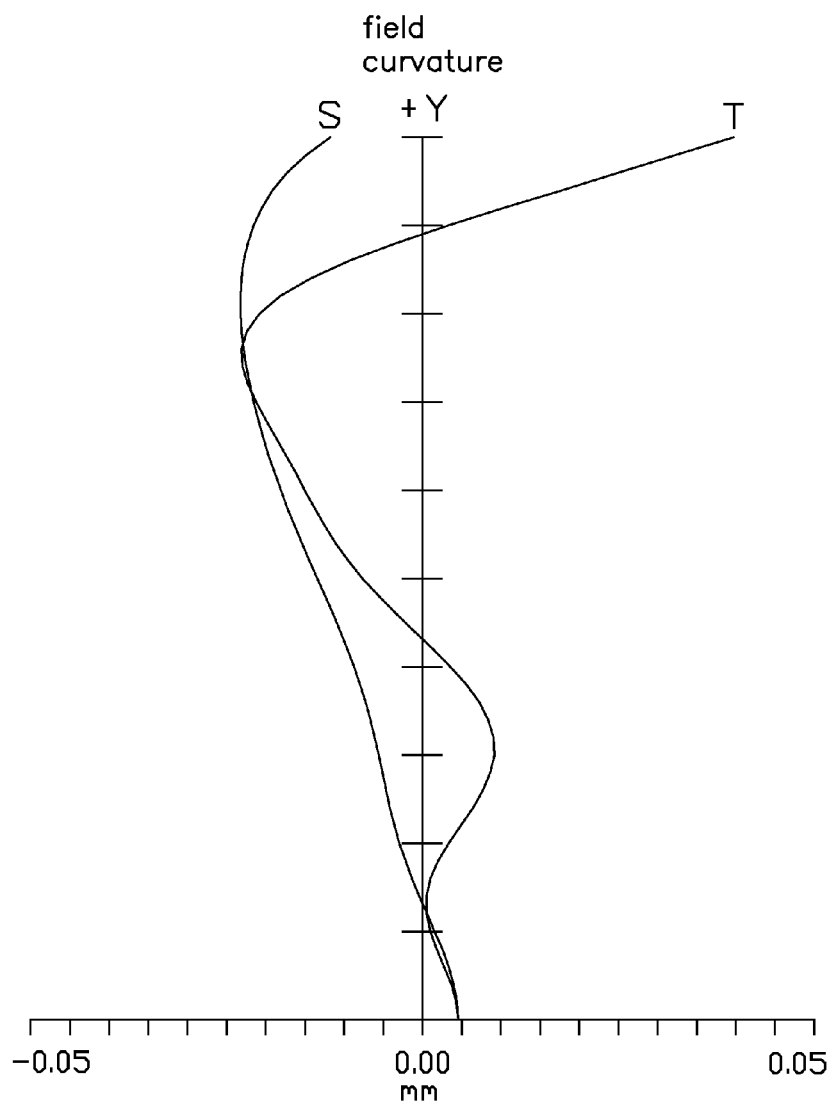
Figure 16:
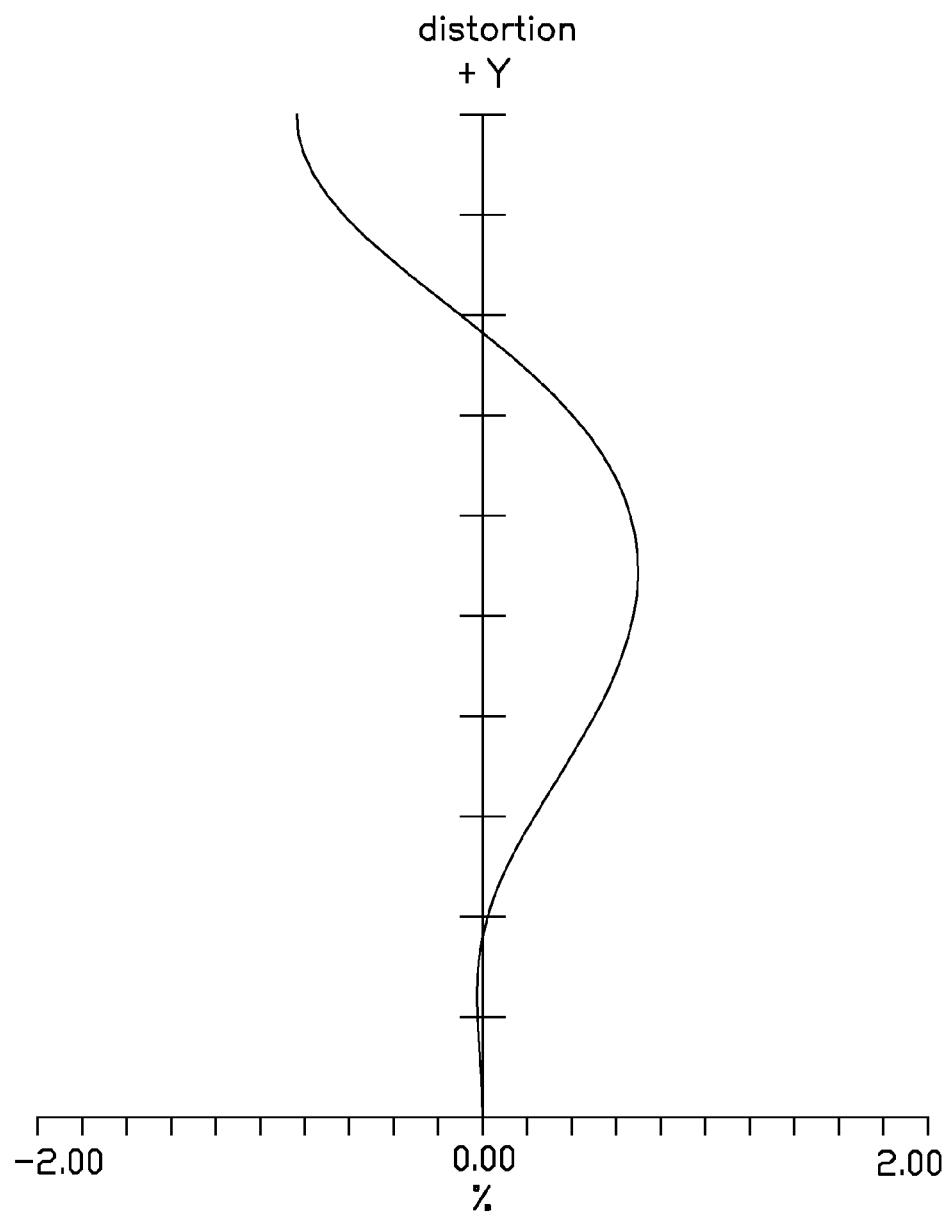
Figure 17:
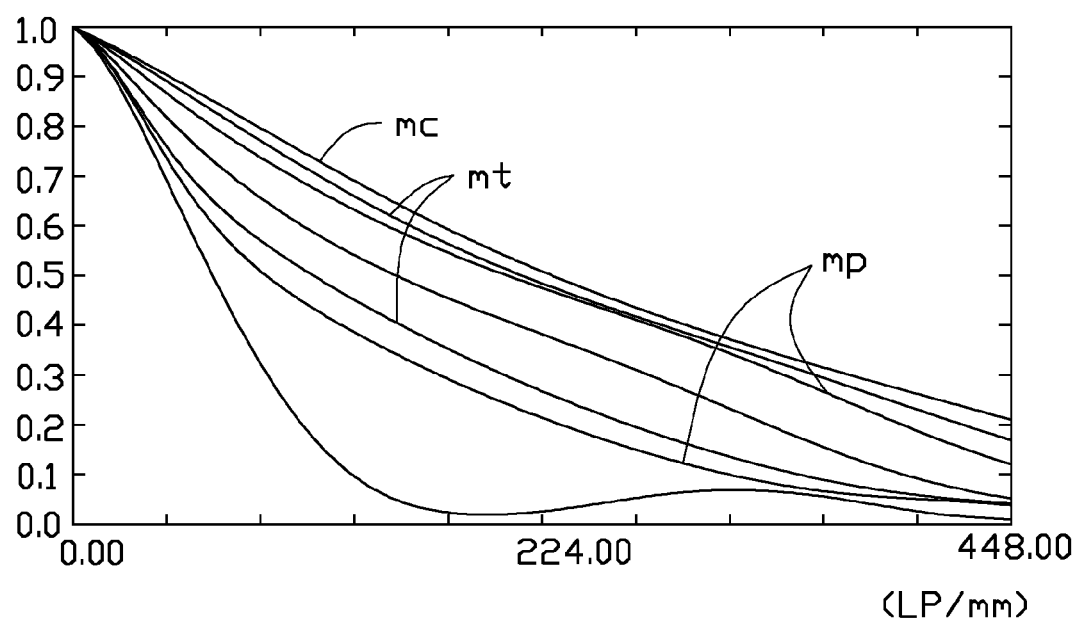

FIGS. 10-13 are graphs of aberrations (spherical aberration, field curvature, distortion, and characteristic curves of modulation transfer function occurring in the image lens 100) of the second exemplary embodiment of the image lens 100 in the telephoto state. FIGS. 14-17 are graphs of aberrations (spherical aberration, field curvature, distortion, and lateral chromatic aberration) of the second exemplary embodiment of the image lens 100 in the wide angle state. In FIGS. 10 and 14, curves are spherical aberration characteristic curves of F light (wavelength: 486 nm), d light (wavelength: 588 nm) and C light (wavelength: 654 nm) of the image system 100. The spherical aberration of the image lens 100 of the second exemplary embodiment is from −0.05 mm to 0.05 mm. As illustrated in FIGS. 11 and 15, the curves T and S are respectively the tangential field curvature curve and the sagittal field curvature curve. The field curvature of the second exemplary embodiment of the image lens 100 is from −0.05 mm to 0.05 mm. In FIGS. 12 and 16, the distortion of the second exemplary embodiment of the image lens system 100 is from −2.00% to 2.00%. Furthermore, as shown in FIG. 13, for half of the Nyquist frequency (about 2241 p/mm), the MTF of the central field is greater than 55% (see curve mc), the MTF of the 0.8 field is greater than 40% (see curve mp), the MTF between the central field and the 0.8 field is in a range of: 40%~55% (see curve mt, for example). As shown in FIG. 17, for half of the Nyquist frequency (about 2241 p/mm), the MTF of the central field is greater than 42% (see curve mc), the MTF of the 0.8 field is greater than 14% (see curve mp), the MTF between the central field and the 0.8 field is in a range of: 14%~42% (see curve mt, for example). Overall, in this embodiment, the spherical aberration, the field curvature, the distortion, and the chief ray angle are limited in a small range.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An image lens, in the order from an object side to an image side thereof, comprising:
    a first lens having positive refraction power and comprising a first surface facing the object side and a second surface facing the image side;
    a second lens having negative refraction power and comprising a third surface facing the object side and a fourth surface facing the image side;
    a third lens having positive refraction power and comprising a fifth surface facing the object side and a sixth surface facing the image side;
    a fourth lens having positive refraction power and comprising a seventh surface facing the object side and a eighth surface facing the image side;
    a fifth lens having negative refraction power and comprising a ninth surface facing the object side and a tenth surface facing the image side; and
    an image plane;
    wherein the image lens satisfies the following formulas:

$$D/TTL > 0.94; \quad (1)$$

$$D/L > 1.21; \quad (2)$$

wherein D is the maximum image diameter of the image plane; TTL is a total length of the image lens, L is a distance from an outmost edge of the tenth surface to an optical axis of the image lens along a direction perpendicular to the optical axis of the image lens;

wherein the image lens further satisfies the formulas:

$$Z/Y>0; \text{ and} \quad (3)$$

wherein Z is a distance from a central point of the seventh surface to an outmost edge of the eighth surface along the optical axis, Y is a distance from an outmost edge of the eighth surface to the optical axis along a direction perpendicular to the optical axis.

2. The image lens as claimed in claim 1, wherein the image lens further satisfies the formulas:

$$R31/F3>R11/F1>0; \quad (4)$$

$$R12/F1<R32/F3<0; \quad (5)$$

Wherein R11 is the curvature radius of the first surface of the first lens; R12 is the curvature radius of the second surface of the first lens; R31 is the curvature radius of the fifth surface of the third lens, R32 is the curvature radius of the sixth surface of the third lens; F1 is focal length of the first lens, and F3 is focal length of the third lens.

3. The image lens as claimed in claim 2, wherein the image lens further satisfies the formulas:

$$R51/F5<R52/F5<0; \quad (6)$$

Wherein R51 is the curvature radius of the ninth surface of the fifth lens; R52 is the curvature radius of the tenth surface of the fifth lens; F5 is focal length of the fifth lens.

4. The image lens as claimed in claim 3, wherein the first, second, third, fourth, fifth, sixth, seventh, eighth, ninth, tenth surfaces are aspherical surfaces.

5. The image lens as claimed in claim 4, wherein the first surface is a convex surface facing the object side, the second surface is a convex surface facing the image side, the third surface is a concave surface facing the object side, and the fourth surface is a concave surface facing the image side, the fifth surface is a convex surface facing the object side, the sixth surface is a convex surface facing the image side, the seven surface is a concave surface facing the object side, the eighth surface is a convex surface facing the image side, the ninth surface is a concave surface facing the object side, the tenth surface is a concave surface facing the image side.

6. The image lens as claimed in claim 5, wherein the image lens further comprises an aperture stop positioned between the first lens and the second lens.

7. The image lens as claimed in claim 6, further comprising an IR-cut filter, wherein the IR-cut filter is positioned between the fifth lens and the image plane.

* * * * *